United States Patent [19]
Miura et al.

[11] Patent Number: 5,990,592
[45] Date of Patent: Nov. 23, 1999

[54] MAGNETS CONTAINING-TYPE ALTERNATING-CURRENT MOTOR AND METHOD OF DESIGNING THE SAME

[75] Inventors: Tetsuya Miura; Yasutomo Kawabata; Yukio Inaguma; Toshinobu Arakawa, all of Aichi-ken, Japan

[73] Assignee: Toyota Jidosha Kabushiki Kaisha, Toyota, Japan

[21] Appl. No.: 09/129,606

[22] Filed: Aug. 5, 1998

[30] Foreign Application Priority Data

Sep. 5, 1997 [JP] Japan ................................ 9-257887

[51] Int. Cl.$^6$ ........................................................ H02K 1/27
[52] U.S. Cl. .................. 310/156; 310/43; 29/598
[58] Field of Search ............................ 310/156, 216, 310/42; 29/596, 598

[56] References Cited

FOREIGN PATENT DOCUMENTS

| 2 645 364 | 10/1990 | France . |
| 2-202329 | 8/1990 | Japan . |
| 7-79536 | 3/1995 | Japan . |

*Primary Examiner*—Nestor Ramirez
*Assistant Examiner*—Karl I.E. Tamai

*Attorney, Agent, or Firm*—Oliff & Berridge, PLC

[57] ABSTRACT

The present invention provides a magnets containing-type motor that minimizes a cogging torque without lowering its output. In a magnets containing-type motor where permanent magnets are set in magnetic pole elements of a rotor, the dimensions of each magnetic pole element are determined to satisfy predetermined relations according to a variety of numerical elements of the motor. In accordance with a concrete arrangement, the dimensions of each magnetic pole element are determined, so as to enable either one of a magnetic pole element opening angle L2 and an equivalent magnetic pole element opening angle L3 to be expressed as $(n+z) \cdot Pp + x \cdot (g/R) + y \cdot (gp/R)$, based on a predetermined relation between a parameter $(t2-t1)/g$ and a predetermined threshold value. In this equation, gp denotes a length of a space between adjoining teeth; Pp denotes a central angular pitch of teeth; R denotes a radius of an inner face of a stator; g denotes an interval between the stator and the rotor; t2 denotes a thickness of a magnetic pole circumferential portion; t1 denotes a thickness of a magnetic pole element side portion; n denotes an arbitrary natural number; and x, y, and z are real numbers that satisfy $-0.6 \leq x \leq 0.6$, $0.3 \leq y \leq 0.5$, and $-0.06 \leq z \leq -0.04$.

9 Claims, 11 Drawing Sheets

MAGNETS CONTAINING-TYPE ALTERNATING-CURRENT MOTOR AND METHOD OF DESIGNING THE SAME

BACKGROUND OF THE INVENTION

1. Field of the Invention

The present invention relates to a technique of improving output characteristics of a permanent magnets-type synchronous alternating-current motor, and more specifically to a technique of improving output characteristics of magnets containing-type alternating-current motor, wherein a rotor has a rotor core element and a plurality of magnetic pole elements protruded from the rotor core element in the diametral direction of the rotor and each magnetic pole element includes a permanent magnet fitted in a permanent magnet insertion aperture formed along the central axis of the rotor.

2. Description of the Related Art

A permanent magnets-type synchronous motor includes a rotatable rotor, which has a plurality of permanent magnets mounted on an outer circumferential face thereof, and a stator that is fixed to a case to circularly surround the circumference of the rotor and has a plurality of teeth, which three-phase coils are wound on. In such a motor, a flow of control electric current through the three-phase coils of the stator forms a revolving magnetic field, and the rotor rotates by the interaction between the revolving magnetic field and a magnetic field formed by the permanent magnets. A variety of improvements and applications of the permanent magnets-type motor, for example, for the driving source of electric vehicles, have recently been tried to realize a small-sized motor having a large output torque.

A magnets containing-type motor is one of the permanent magnets-type synchronous motors and has permanent magnets embedded in the rotor instead of being applied on the outer circumferential face of the rotor. This structure prevents the permanent magnets from being stripped off by the centrifugal force produced during the rotation of the rotor. The magnets containing-type motor accordingly has the high reliability under the condition of high-speed rotation. In the magnets containing-type motor, the control electric currents are flown through the three-phase coils on the stator to produce a revolving magnetic field. The rotor is revolved through the interaction between the revolving magnetic field and the magnetic field formed by the permanent magnets. For convenience of explanation, the 'permanent magnets-type synchronous motor' hereinafter does not include the magnets containing-type motor.

The torque generated in the permanent magnets-type synchronous motor and the magnets containing-type motor depends upon the strength of the revolving magnetic field formed by the three-phase coils wound on the stator, the strength of the magnetic field formed by the permanent magnets, and the loss in the teeth of the stator. The magnitude of the torque is varied by the positional relationship between the teeth of the stator and the permanent magnets at the time of rotation. This results is generating a cogging torque. The cogging torque makes the rotation of the motor unstable and causes the noise and vibration of the motor.

An increase in distance between the teeth of the stator and the permanent magnets of the rotor reduces the cogging torque and ascertains the smooth rotations of the alternating-current motor. The increased distance, however, undesirably lowers the output of the motor.

A variety of techniques have been proposed to reduce the cogging torque by taking into account these problems. The applicant of the present invention has proposed a motor that satisfies Equation (1) given below (JAPANESE PATENT LAID-OPEN GAZETTE No. 2-202329):

$$L = n \cdot Pp + x \cdot g + y \cdot gp + z \cdot Pp \tag{1}$$

where L denotes the length of the permanent magnet in the circumferential direction that gives the minimum cogging torque, g denotes the interval between the rotor and the stator, gp denotes the gap between the adjoining teeth of the stator, Pp denotes the teeth pitch, n denotes an arbitrary natural number, x denotes a real number satisfying $0.4 \leq x \leq 0.6$, y denotes a real number satisfying $0.3 \leq y \leq 0.5$, and z denotes a real number satisfying $-0.06 \leq z \leq -0.04$.

In a proposed magnets containing-type motor with the permanent magnets embedded in the circular iron core, the residual magnetic flux density of the permanent magnets is used to determine the dimensions between the permanent magnets, in order to reduce the vibration and the noise due to the cogging torque (JAPANESE PATENT LAID-OPEN GAZETTE No. 7-79536).

The cogging torque is significantly affected by the magnetic flux density of the clearance between the rotor and the stator. These techniques are accordingly not applicable to the magnets containing-type motor having the magnetic pole elements that are protruded substantially in the diametral direction from the rotor core element.

FIGS. 12A and 12B show examples of the computer-aided analysis for determining the magnitude of the cogging torque. In the graphs of FIGS. 12A and 12B, L1 represents the central angle of the arc of the permanent magnet (hereinafter referred to as the 'magnet opening angle') and Pp represents the angular pitch of the teeth of the stator. The graph of FIG. 12A shows the relationship between the magnet opening angle L1 and the cogging torque in the case of t1=t2=0, where t1 denotes the interval between the side face of the magnetic pole element and the permanent magnet, t2 denotes the interval between the circumferential face of the magnetic pole element and the permanent magnet, and g denotes the gap or the interval between the inner circumferential face of the stator and the outer circumferential face of the magnetic pole element. In the case of FIG. 12A, there are no magnetic pole elements and the permanent magnets are directly applied on the outer circumferential face of the rotor. Ranges A1 and A2 in FIGS. 12A show the magnet opening angles that give the minimum cogging torque, which are determined by the technique described in JAPANESE PATENT LAID-OPEN GAZETTE No. 2-202329. As shown in FIG. 12A, in the permanent magnets-type synchronous motor, the cogging torque is minimized in the ranges of the magnet opening angle L1 determined by the technique described in the above-mentioned gazette.

FIG. 12B shows the relationship between the magnet opening angle L1 and the cogging torque in the case of t1=4 g and t2=2 g, that is, in the case where the permanent magnets are fitted in the magnetic pole elements of predetermined dimensions in the magnets containing-type motor. As shown in FIG. 12B, the magnet opening angles L1 that give the minimum cogging torque are greater than the ranges A1 and A2 of the magnet opening angle L1 determined by the technique described in the above-mentioned gazette. This means that the magnet opening angles L1 determined by the technique described in the above-mentioned gazette can not minimize the cogging torque in the magnets containing-type motor.

It is necessary to minimize the cogging torque while satisfying a variety of requirements, such as the maximum torque and the power consumption, in the process of designing the motor. It is possible to change the variety of parameters and determine the magnet opening angle that gives the minimum cogging torque based on the computer-aided analysis, every time when the magnets containing-type motor is designed. Such analysis, however, causes an extremely large design load.

SUMMARY OF THE INVENTION

The object of the present invention is thus to provide a magnets containing-type motor that minimizes a cogging torque without lowering its output, as well as a method of designing such a motor.

At least part of the above and the other related objects is realized by a first magnets containing-type alternating-current motor, which includes: a stator having a plurality of teeth that are arranged at a fixed central angular pitch Pp(rad) on a circumference of a circular cross section, each pair of adjoining teeth being separated from each other across a space having a length gp(m); a rotor that includes a rotor core element and a plurality of magnetic pole elements protruded from the rotor core element in a diametral direction of the circular cross section and is rotatable about a central axis of the circular cross section; and a plurality of permanent magnets, each of which is fitted in a permanent magnet insertion aperture that is formed inside each of the plurality of magnetic pole elements along the central axis of the circular cross section. Each of the plurality of magnetic pole elements has an arc face defined by an arc of a radius that is different by a gap g(m) from a radius R(m) of an arc defining an outer face of the stator facing the rotor, and a pair of side faces defined by a pair of substantially parallel lines that extend from the rotor core element substantially in the diametral direction of the circular cross section. The permanent magnet insertion aperture is defined by an arc of a radius that is different from a length t2(m) from the arc face and a pair of substantially parallel lines that are respectively located inside the pair of side faces by a length t1(m). Each of the plurality of permanent magnets has a sectional configuration substantially identical with that of the permanent magnet insertion aperture and is magnetized to make a magnetic flux flow substantially in the diametral direction of the circular cross section. An expression of $(t2-t1)/g \leq 2$ is satisfied, and a central angle L2(rad) of the arc defining the arc face of the magnetic pole element (hereinafter referred to as the 'magnetic pole element opening angle') is expressed by Equation (2) given below:

$$L2 = (n+z) \cdot Pp + x \cdot (g/R) + y \cdot (gp/R) \qquad (2)$$

The present invention is also directed to a second magnets containing-type alternating-current motor, which includes: a stator having a plurality of teeth that are arranged at a fixed central angular pitch Pp(rad) on a circumference of a circular cross section, each pair of adjoining teeth being separated from each other across a space having a length gp(m); a rotor that includes a rotor core element and a plurality of magnetic pole elements protruded from the rotor core element in a diametral direction of the circular cross section and is rotatable about a central axis of the circular cross section; and a plurality of permanent magnets, each of which is fitted in a permanent magnet insertion aperture that is formed inside each of the plurality of magnetic pole elements along the central axis of the circular cross section. Each of the plurality of magnetic pole elements has an arc face defined by an arc of a radius that is different by a gap g(m) from a radius R(m) of an arc defining an outer face of the stator facing the rotor, and a pair of side faces defined by a pair of substantially parallel lines that extend from the rotor core element substantially in the diametral direction of the circular cross section. The permanent magnet insertion aperture is defined by an arc of a radius that is different from a length t2(m) from the arc face and a pair of substantially parallel lines that are respectively located inside the pair of side faces by a length t1(m). Each of the plurality of permanent magnets has a sectional configuration substantially identical with that of the permanent magnet insertion aperture and is magnetized to make a magnetic flux flow substantially in the diametral direction of the circular cross section. An expression of $(t2-t1)/g \leq 0$ is satisfied, and a central angle L3(rad) of an arc, which is obtained by cutting a length 2 g(m) from an arc defined by intersections of a pair of substantially parallel lines, which define a pair of side faces of the permanent magnet fitted in the permanent magnet insertion aperture, and the arc face of the magnetic pole element (hereinafter referred to as the 'equivalent magnetic pole element opening angle'), is expressed by Equation (3) given below:

$$L3 = (n+z) \cdot Pp + x \cdot (g/R) + y \cdot (gp/R) \qquad (3)$$

In Equations (2) and (3) given above, n denotes an arbitrary natural number, x denotes a real number satisfying $-0.6 \leq x \leq 0.6$, y denotes a real number satisfying $0.3 \leq y \leq 0.5$, and z denotes a real number satisfying $-0.06 \leq z \leq -0.04$.

In order to facilitate the understanding, FIG. 1 shows the definitions of the above quantities regarding the inner rotor-type motor (hereinafter referred to as the 'numerical elements of the motor').

The present invention is based on the computer-aided analysis regarding the magnets containing-type alternating-current motor that has the magnetic pole elements protruded in the diametral direction from the rotor core element. The analysis computes the cogging torque in a virtual magnets containing-type motor in which the magnetic pole element opening angle L2 or the equivalent magnetic pole element opening angle L3 and the variety of other numerical elements of the motor are varied, and determines the relationship that minimizes the cogging torque. The magnets containing-type motor designed to satisfy the condition of either Equation (2) or Equation (3) given above has the minimum cogging torque.

The following describes computation of the cogging torque based on the computer-aided analysis. FIG. 2 is an enlarged view showing one magnetic pole element 206 of the magnets containing-type motor to explain one example of the analysis. Curves, for example, ml1, in FIG. 2 represent magnetic lines of force in the state that the numerical elements of the motor are set to specific values and no electricity is supplied to the three-phase coils of the stator 100. As shown in FIG. 2, the magnetic lines of force run substantially in parallel to the diametral direction inside the permanent magnet 208 and form complicated curves in the rotor core element 204 and the magnetic pole element 206 of the rotor 200. Part of the magnetic lines of force running in the magnetic pole element 206 pass through a clearance 210 and reach the teeth 104 of the stator 100. There are no magnetic lines of force passing through a teeth gap element 104a of the stator 100 in FIG. 2. This shows that the teeth gap element 104a of the stator 100 has a lower density of the magnetic lines of force (hereinafter referred to as the 'magnetic flux density') compared with the other portions of the teeth 104.

The torque of the motor is generated by the interaction between a revolving magnetic field formed in the stator 100 and a magnetic field formed by the permanent magnets 208 embedded in the rotor 200. The magnitude of the torque is significantly affected by the magnetic flux density of the clearance 210. As clearly shown in FIG. 2, the magnetic flux density of the clearance 210 is high at the position where the magnetic pole element 206 of the rotor 200 faces the teeth 104 of the stator 100 and is low at the position where the magnetic pole element 206 faces the teeth gap element 104*a* of the stator 100. Namely the magnetic flux density of the clearance 210 is not distributed homogeneously along the circumference.

It is generally known that an attractive force, that is, a force for narrowing the interval between the magnetic lines of force, is applied between the magnetic lines of force. If the magnetic lines of force in the clearance 210 are uniformly distributed along the circumference, no torque is generated in the rotor 200. Since the magnetic lines of force are not homogeneously distributed in the clearance 210 as described above, however, a torque is generated in the rotor 200. The magnitude of the torque is calculated by integrating the force applied between the magnetic lines of force in the circumferential direction, and is varied according to the positional relationship between the stator 100 and the rotor 200. This torque is present even when no electricity is supplied to the three-phase coils, that is, even when no revolving magnetic field is formed by the stator 100. This torque remains in the state that electricity is supplied to the three-phase coils. In this state, the sum of this torque and the torque generated by the revolving magnetic field is present in the rotor 200. The torque generated in the rotor 200 is thus varied by the positional relationship between the stator 100 and the rotor 200, which results in causing a cogging torque. The cogging torque is not ascribed to only this reason, but may be caused by a variety of reasons.

The maximum torque can be determined by varying the positional relationship between the stator 100 and the rotor 200 while the rotor 200 rotates. The maximum torque denotes a representative value of the cogging torque with respect to each combination of the numerical elements of the motor. When a combination of the numerical elements t1 and t2 that defines the dimensions of the magnetic pole element 206 is selected, the representative value of the cogging torque can be plotted against the magnet opening angle L1 as shown in FIGS. 12A and 12B. In the graphs of FIGS. 12A and 12B, for the purpose of generalization, the magnet opening angle L1 is divided by the central angular pitch Pp of the teeth 104 of the stator 100 and expressed as a non-dimensional value. There are a plurality of magnet opening angles L1 that give the cogging torque equal to zero. These magnet opening angles L1 are hereinafter referred to as the optimum magnet opening angles. The cogging torque is plotted against the magnet opening angle L1 in the graphs of FIGS. 12A and 12B. The cogging torque can also be plotted against the magnetic pole element opening angle L2. This plot determines optimum magnetic pole element opening angles L2.

The following describes the relationship between the optimum magnetic pole element opening angle L2 and the numerical elements t1 and t2. FIG. 3 shows the optimum magnetic pole element opening angles L2 plotted against various combinations of t1 and t2. In the graph of FIG. 3, for the purpose of generalization, non-dimensional values (t2−t1)/g and L2/Pp are plotted respectively as abscissa and ordinate. The variable (t2−t1)/g plotted as abscissa is not a known variable used for understanding the characteristics of the motor, but has been selected by the applicant of the present invention for the purpose of analysis. Selection of the magnetic pole element opening angle L2 as the variable has been carried out for the same purpose.

Using the magnetic pole element opening angle L2 gives the favorable results shown in FIG. 3, because of the following reasons. When the dimensions of the magnetic pole element 206 satisfy the condition of $t2 \geq t1$, there are magnetic lines of force ml1 that pass through the intersection of the magnetic pole side portion 206*a* and the magnetic pole circumferential portion 206*b* and reach the clearance 210, according to the results of analysis of the magnetic lines of force shown in FIG. 2. The cogging torque is significantly affected by the magnetic flux density of the clearance 210. The presence of the magnetic lines of force ml1 makes the magnets containing-type motor under the condition of $t2 \geq t1$ correspond to the permanent magnets-type motor with permanent magnets having the dimensions equivalent to those of the magnetic pole element 206. The relation that includes the magnet opening angle as the parameter and minimizes the cogging torque in the permanent magnets-type motor is disclosed in JAPANESE PATENT LAID-OPEN GAZETTE No. 2-202329. In the magnets containing-type motor, the magnetic pole element opening angle should thus be used in place of the magnet opening angle.

The optimum magnetic pole element opening angle L2 originally has a large scatter according to the combination of the dimensions t1 and t2. Using the variable (t2−t1)/g plotted as abscissa decreases the scatter to an extremely small level in a certain range as shown in the graph of FIG. 3. Under the condition of $(t2-t1)/g \geq 2$, the optimum magnetic pole element opening angle L2 converges to the ranges specified by the above Equation (2) regarding the relation of the numerical elements of the motor (that is, the ranges (a1) and (a2) in FIG. 3). FIG. 6 is a graph showing the relationship between the magnet opening angle that gives the minimum cogging torque and the numeral elements of the magnetic pole element. It shows the same results of analysis as shown in FIG. 3. The magnet opening angle does not converge anywhere in FIG. 6.

The specific ranges of FIG. 3 where the scatter is reduced to an extremely small level are generally considered as the area where the cogging torque is sufficiently reduced. The magnets containing-type motor designed to have the numerical elements of the motor within the ranges (a1) and (a2) of FIG. 3 accordingly has the sufficiently reduced cogging torque.

The analysis discussed above regards the magnets containing-type motor having the rotor on the center and the stator on the circumference thereof. The results of the analysis are fundamentally applicable to the outer rotor-type motor. The outer rotor-type motor has the stator on the center and the ring-shaped rotor surrounding the stator. The control electric currents are flown through the three-phase coils to generate a revolving magnetic field, which results in rotating the ring-shaped outer rotor. In the motor, the gap g of the clearance 210 is significantly smaller than the radius R, so that the sides of the rotor and the stator facing each other can be regarded as locally parallel to each other. The analysis performed for the motor with the rotor on its center is thus fundamentally applicable to the outer rotor-type motor having the rotor outside the stator.

The following describes an example of the analysis using the equivalent magnetic pole element opening angle L3 as the parameter. The technique of the computer-aided analysis in the second magnets containing-type motor is almost the same as the technique adopted for the first magnets containing-type motor of the present invention. FIG. 4 shows an example of the results of analysis regarding the magnetic lines of force in the state that the numerical elements of the motor are set to specific values and no electricity is supplied to the three-phase coils of the stator. Like the results of analysis regarding the first magnets containing-type motor shown in FIG. 2, the magnetic flux density of the clearance 210 is not homogeneously distributed along the circumference, so that a cogging torque is generated. Although not being specifically illustrated, like the analysis regarding the first magnets containing-type motor, in the second magnets containing-type motor, there is an optimum equivalent magnetic pole element opening angle L3 that gives to the cogging torque equal to zero, with respect to each combination of the numerical elements t1 and t2 (see FIG. 1) that define the dimensions of the magnetic pole element 206.

FIG. 5 shows the optimum equivalent magnetic pole element opening angles L3 plotted against various combinations of t1 and t2. In the graph of FIG. 5, for the purpose of generalization, non-dimensional values (t2−t1)/g and L3/Pp are plotted respectively as abscissa and ordinate. Like the variable used for the analysis in the first magnets containing-type motor, selection of the equivalent magnetic pole element opening angle L3 as the variable on the ordinate has been carried out by the applicant of the present invention for the purpose of analysis.

Using the equivalent magnetic pole element opening angle L3 as the variable gives the favorable results shown in FIG. 5, because of the following reasons. When the dimensions of the magnetic pole element 206 satisfy the condition of t2≦t1, there are magnetic lines of force m12 that pass through the magnetic pole side portion 206a and return to the permanent magnet 208, according to the results of analysis of the magnetic lines of force shown in FIG. 4. The circular magnetic lines of force do not run into the clearance 210 and thus hardly affect the cogging torque. This means the end portions of the permanent magnet 208 hardly affect the cogging torque. It is accordingly considered that the magnets containing-type motor under the condition of t2≦t1 corresponds to the permanent magnets-type motor with the permanent magnets having a little shorter length in the circumferential direction. The results of analysis of FIG. 4 show that the length of the little shorter permanent magnet in the circumferential direction is determined by extending both ends of the permanent magnet 208 to the arc face of the magnetic pole element 206 and cutting both ends of the resulting arc by the gap g of the clearance 210. In the magnets containing-type motor, the equivalent magnetic pole element opening angle should thus be used in place of the magnet opening angle.

The optimum equivalent magnetic pole element opening angle L3 originally has a large scatter according to the combination of the dimensions t1 and t2. Using the variable (t2−t1)/g plotted as abscissa decreases the scatter to an extremely small level in a certain range as shown in the graph of FIG. 5. Under the condition of (t2−t1)/g≦0, the optimum equivalent magnetic pole element opening angle L3 converges to the ranges specified by the above Equation (3) regarding the relation of the numerical elements of the motor (that is, the ranges (a3) and (a4) in FIG. 5). FIG. 6 is a graph showing the relationship between the magnet opening angle that gives the minimum cogging torque and the numeral elements of the magnetic pole element. It shows the same results of analysis as shown in FIG. 3. The magnet opening angle does not converge anywhere in FIG. 6.

The specific ranges of FIG. 5 where the scatter is reduced to an extremely small level are generally considered as the area where the cogging torque is sufficiently reduced. The magnets containing-type motor designed to have the numerical elements of the motor within the ranges (a3) and (a4) of FIG. 5 accordingly has the sufficiently reduced cogging torque. This relationship is also valid in the outer rotor-type motor.

The parameter that specifies the central angle of the arc face of the magnetic pole element is not restricted to the magnetic pole element opening angle L2 or the equivalent magnetic pole element opening angle L3. The function that gives the minimum cogging torque according to the preset parameter is not restricted to the above functions. Based on the results of analysis discussed above, the applicable function is a linear polynomial of Pp, g/R, and gp/R that is specified according to the comparison between the value (t2−t1)/g and a predetermined threshold value. The motor having the parameter specified by such a function has the minimum cogging torque.

The present invention is further directed to a method of designing a magnets containing-type alternating-current motor. The magnets containing-type alternating-current motor includes: a stator having a plurality of teeth that are arranged at a fixed central angular pitch Pp on a circumference of a circular cross section, each pair of adjoining teeth being separated from each other across a space having a length gp; a rotor that includes a rotor core element and a plurality of magnetic pole elements protruded from the rotor core element in a diametral direction of the circular cross section and is rotatable about a central axis of the circular cross section; and a plurality of permanent magnets, each of which is fitted in a permanent magnet insertion aperture that is formed inside each of the plurality of magnetic pole elements along the central axis of the circular cross section. The method includes the steps of: (a) designing each of the plurality of magnetic pole elements to have a sectional configuration including an arc face defined by an arc of a radius that is different by a gap g from a radius R of an arc defining an outer face of the stator facing the rotor, and a pair of side faces defined by a pair of substantially parallel lines that extend from the rotor core element substantially in the diametral direction of the circular cross section; (b) designing the permanent magnet insertion aperture to have a sectional configuration including an arc of a radius that is different from a length t2 from the arc face and a pair of substantially parallel lines that are respectively located inside the pair of side faces by a length t1; (c) designing each of the plurality of permanent magnets to have a sectional configuration substantially identical with that of the permanent magnet insertion aperture and to be inserted into the permanent magnet insertion aperture in order to make a magnetic flux flow substantially in the diametral direction of the circular cross section; and (d) setting a parameter that specifies a central angle of the arc face of the magnetic pole element equal to a value that minimizes a cogging torque, based on a function of R, Pp, g, and gp provided according to a predetermined relation of t1, t2, and g.

As described previously, the computer-aided analysis determines the cogging torque in the magnets containing-type motor. The designing method of the present invention computes the numerical elements of the motor that give the minimum cogging torque as a general function, based on the results of the analysis. This reduces the design load of the magnets containing-type motor. In the process of designing the motor, it is necessary to minimize the cogging torque while satisfying the various requirements, such as the output torque and the power consumption. The designing method of the present invention ascertains the minimum cogging torque to some extent and thereby reduces the design load of the magnets containing-type motor, so as to attain the adequate design.

In the present invention, the 'parameter that specifies the central angle of the arc face of the magnetic pole element', which is to be set in the process of designing the rotor, is given as a function of the numerical elements R, Pp, and gp that define the dimensions of the stator. This arrangement allows the method to design the stator prior to the rotor that minimizes the cogging torque, thereby enabling the magnets containing-type motor to be designed in a simple way.

In the designing method of the present invention, it is preferable that the predetermined relation of t1, t2, and g represents which is greater between the parameter (t2−t1)/g and a predetermined threshold value.

The function is preferably a linear polynomial of Pp, g/R, gp/R that is specified according to the predetermined relation of t1, t2, and g.

A variety of functions may be adopted to determine the numerical elements of the motor that give the minimum cogging torque. Extremely complicated functions, however, make the computation undesirably difficult in the course of the design. The dimensional variables are inconvenient since even a little variation in dimensions of the motor requires an individual function. The function used here is a linear polynomial, which is one of the simplest functions, and uses non-dimensional variables. This arrangement is accordingly free from the inconvenience.

Lots of trial and error are required to find the function for determining the numerical elements of the motor that give the minimum cogging torque. The above function is, however, required to specify only four constants and thereby sufficiently reduces the design load.

Based on the results of analysis discussed previously, it is preferable that the parameter may be the central angle L2 of the arc face of the magnetic pole element (magnetic pole element opening angle) or the central angle L3 of the arc (equivalent magnetic pole element opening angle), which is obtained by cutting a length 2 g from an arc defined by intersections of a pair of substantially parallel lines, which define a pair of side faces of the permanent magnet fitted in the permanent magnet insertion aperture, and the arc face of the magnetic pole element.

In accordance with one concrete arrangement, the parameter is a central angle L2 of the arc face of the magnetic pole element, the predetermined relation satisfies an expression of $(t2-t1)/g \geq 2$, and the function that defines the parameter L2 under the predetermined relation is expressed by Equation (2) given above.

In accordance with another concrete arrangement, the parameter is a central angle L3 of an arc, which is obtained by cutting a length 2 g from an arc defined by intersections of a pair of substantially parallel lines, which define a pair of side faces of the permanent magnet fitted in the permanent magnet insertion aperture, and the arc face of the magnetic pole element, the predetermined relation satisfies an expression of $(t2-t1)/g \leq 0$, and the function that defines the parameter L3 under the predetermined relation is expressed by Equation (3) given above.

These designing methods are applicable to not only the magnets containing-type motors, where the rotor is located on the central portion, but outer rotor-type motors.

These and other objects, features, aspects, and advantages of the present invention will become more apparent from the following detailed description of the preferred embodiment with the accompanying drawings.

DESCRIPTION OF THE PREFERRED EMBODIMENTS

Figure 7:
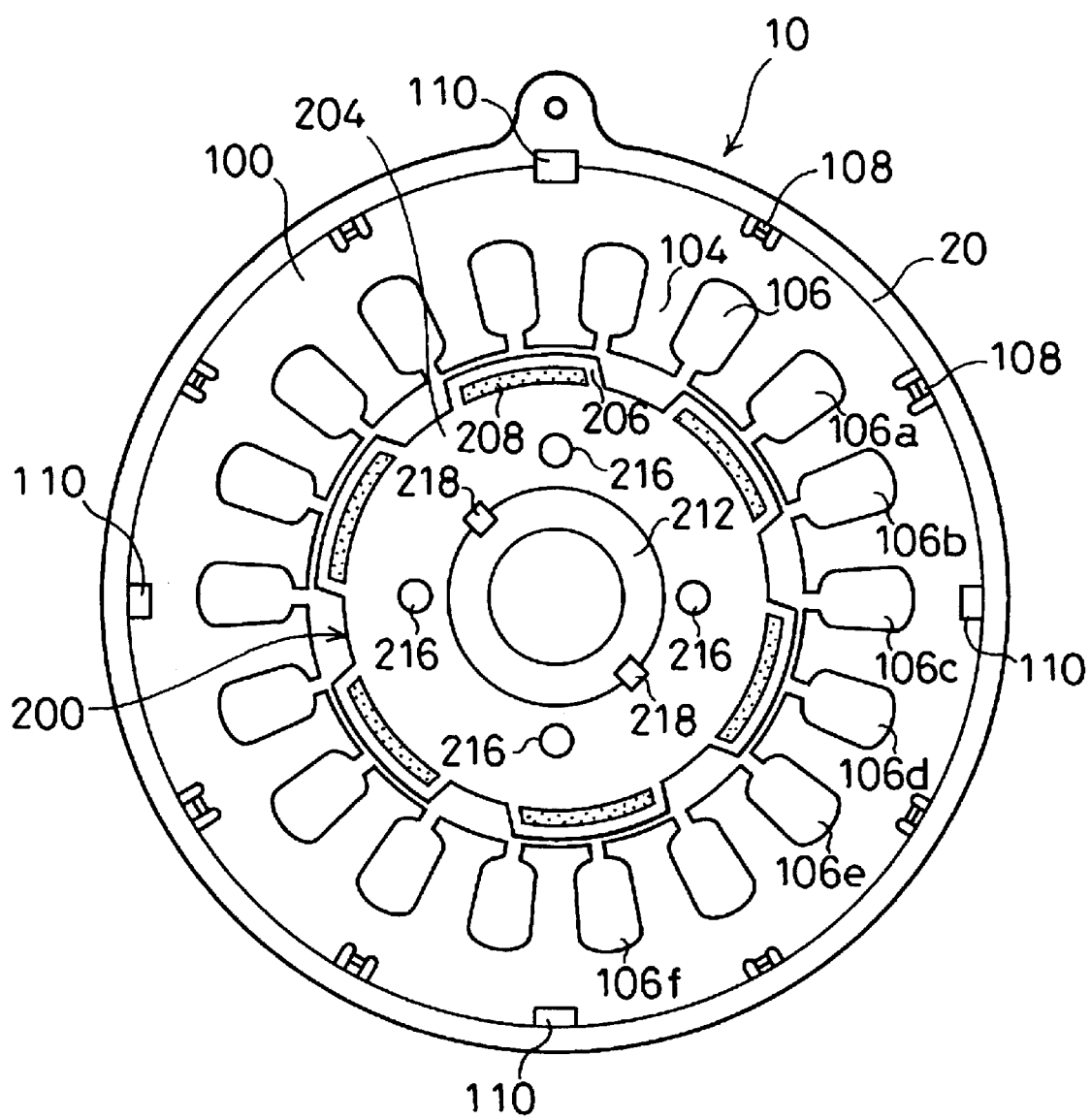
FIG. 7 is a sectional view illustrating the structure of the magnets containing-type motor of the embodiment, cut by the plane perpendicular to a rotating shaft thereof.
Figure 8:
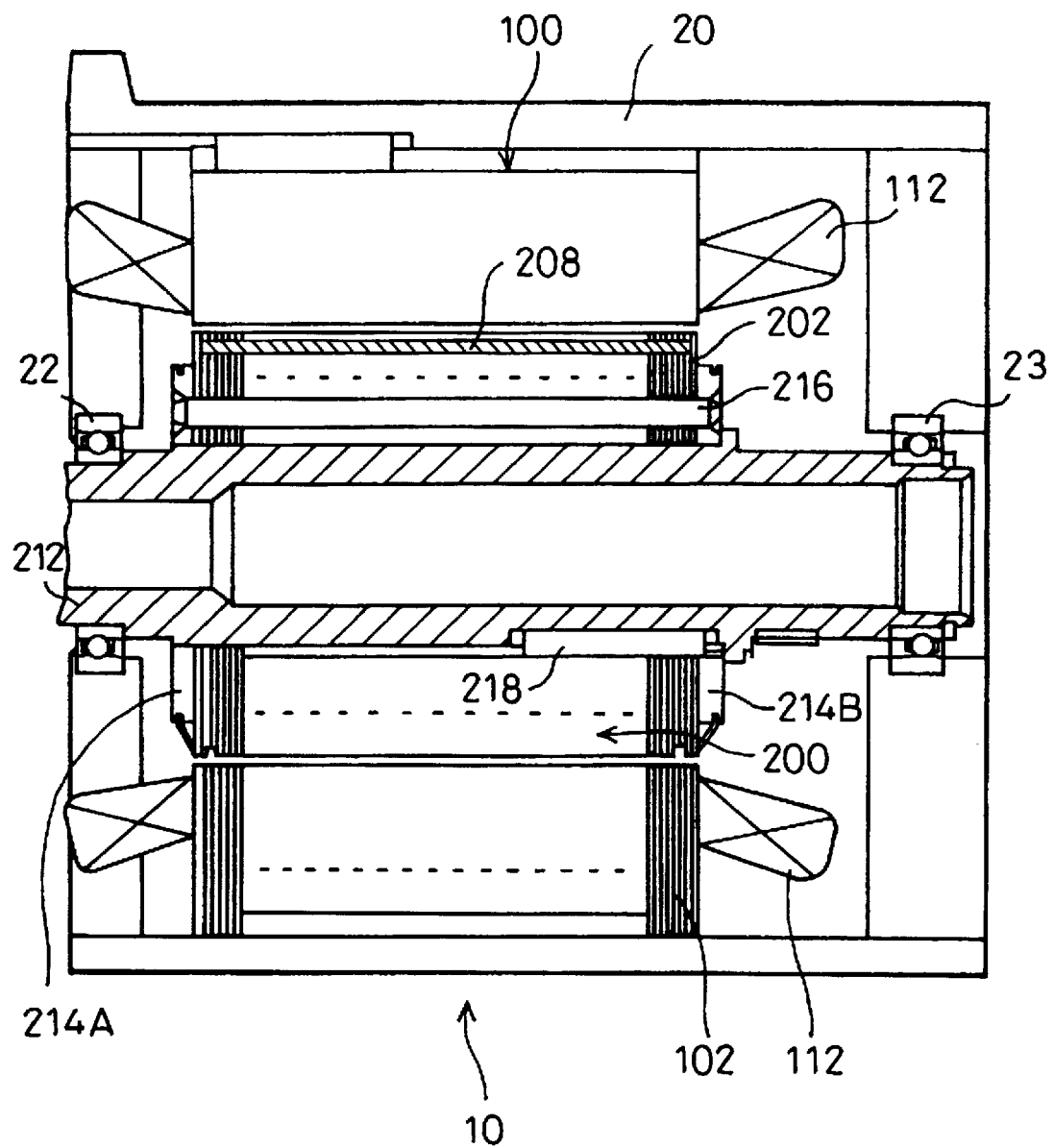
FIG. 8 is a sectional view illustrating the structure of the magnets containing-type motor of the embodiment, cut by the plane including the rotating shaft.

Referring to FIGS. 7 and 8, the general structure of the magnets containing-type motor 10 is described first. The magnets containing-type motor 10 mainly includes a stator 100, a rotor 200, and a case 20 for accommodating the stator 100 and the rotor 200 therein. Eighteen teeth 104 are arranged at equiangular pitches on the stator 100, and three coils of U, V, and W phases are wound on slots 106 formed between the respective adjoining teeth 104. Six magnetic pole elements 206 containing permanent magnets 208 are arranged at equiangular pitches on the rotor 200. A hollow rotating shaft 212 placed on the axial center of the rotor 200 is rotatably supported by bearings 22 and 23 attached to the case 20.

The rotor 200 is provided by laying a plurality of non-directional electromagnetic steel rotor elements 202 one upon another. The non-directional electromagnetic steel rotor elements 202 are punched out of a thin plate of non-directional electromagnetic steel and formed to the shape shown in FIG. 7. The non-directional electromagnetic steel rotor elements 202 are positioned and laid one upon another through insertion of assembly pins 216 into four apertures, and fixed to one another by welding or caulking the pins 216 to both end plates 214A and 214B. The center of the rotor 200 is formed hollow to enable the rotating shaft 212 to be pressed in, and has key grooves in which keys 218 are inserted. The rotating shaft 212 also has key grooves. The rotating shaft 212 is pressed into the rotor 200 while the keys 218 are fitted in the key grooves. This arrangement enables the rotating shaft 212 and the rotor 200 to rotate integrally.

Figure 1:
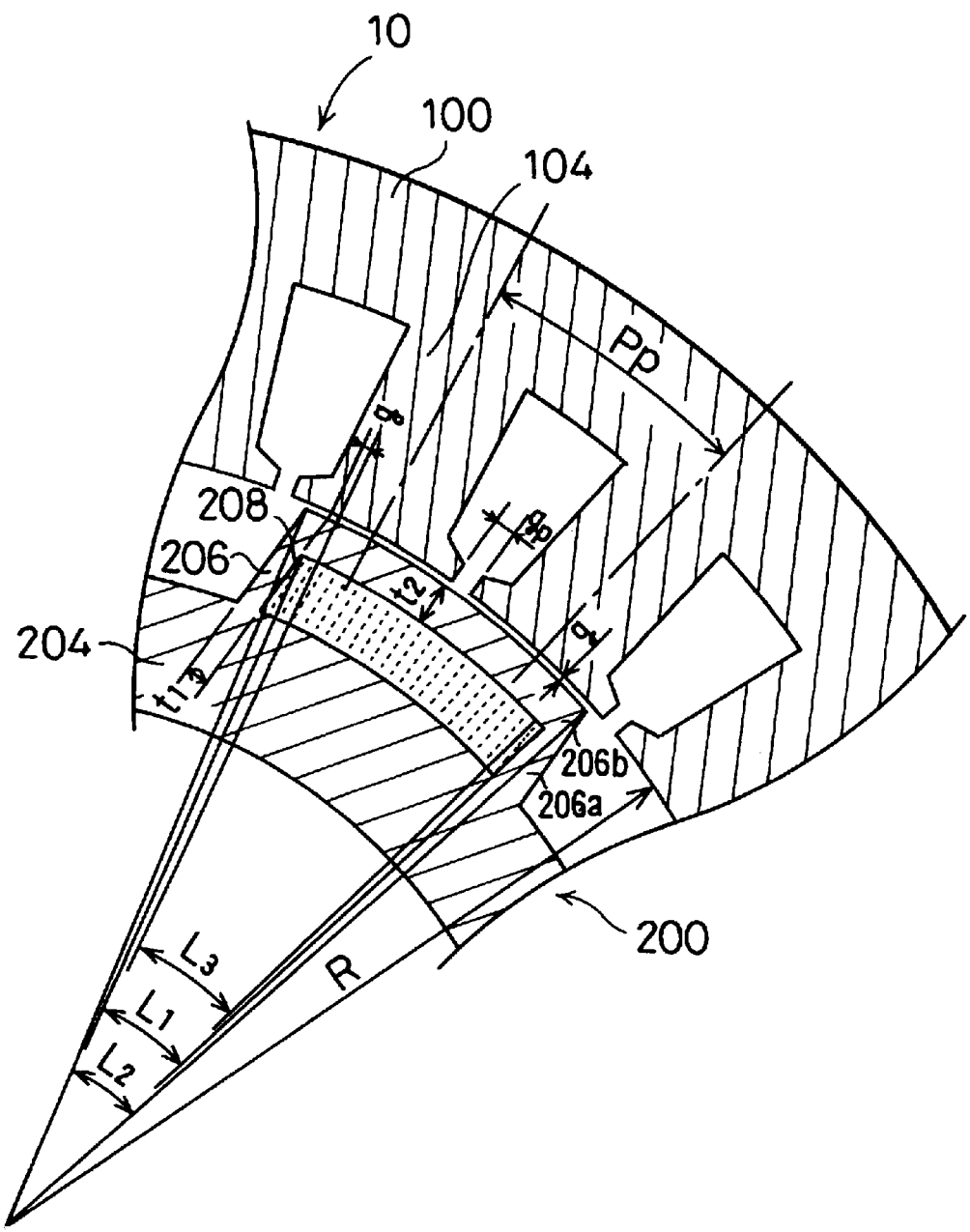
FIG. 1 is an enlarged sectional view illustrating the structure of a magnets containing-type motor embodying the present invention.

The rotor 200 has the six magnetic pole elements 206 protruded in the diametral direction from an outer circumference of a circular rotor core element 204 as shown in FIG. 7. Each magnetic pole element 206 has an arc face, which is formed by an arc having a shorter radius than the radius of an arc that forms the inner face of the stator 100 by a length g as shown in FIG. 1, and side faces defined by a pair of parallel lines extending substantially in the diametral direction from the rotor core element 204. The magnetic pole element 206 has a permanent magnet insertion aperture, which the permanent magnet 208 is fitted in. The permanent magnet insertion aperture has an outer arc face, which is formed by an arc having a shorter radius than the radius of the arc face of the magnetic pole element 206 by a length t2 as shown in FIG. 1, side faces defined by a pair of parallel lines that are located inside the side faces of the permanent magnet element 206 by a length t1 as shown in FIG. 1, and an inner arc face having the radius approximately equal to the radius of the rotor core element 204. The values of t1, t2, and g are selected to minimize the cogging torque as discussed later. For convenience of explanation, part (206a in FIG. 1) of the magnetic pole element 206 that forms the side face of the permanent magnet insertion aperture is hereinafter referred to as the magnetic pole side portion, and part (206b in FIG. 1) of the magnetic pole element 206 that forms the arc face of the permanent magnet insertion aperture is referred to as the magnetic pole circumferential portion.

The inner arc face of the permanent magnet insertion aperture closer to the axial center does not necessarily have an identical radius to that of the rotor color element 204, but may have a smaller radius than that of the rotor core element 204. The permanent magnet insertion aperture has the side faces defied by a pair of parallel lines. The excessively small radius of the inner arc face causes the two corners of the insertion aperture closer to the axial center to have acute angles and thereby worsens the workability. The structure of this embodiment takes into account this fact and causes the inner arc face of the permanent magnet insertion aperture closer to the axial center to have substantially the same radius as that of the rotor core element 204.

Although the rotor core element 204 and the magnetic pole elements 206 of the rotor 200 are described as separate elements as a matter of convenience of explanation, these elements are integrally formed in this embodiment. Alternatively the magnetic pole elements 206 that are separately formed may be welded to or joined to the rotor core element 204.

Each permanent magnet 208 having a substantially identical sectional configuration to that of the permanent magnet insertion aperture is fitted in the permanent magnet insertion aperture of the magnetic pole element 206 and fixed by the end plates 214A and 214B. Each permanent magnet 208 is magnetized substantially in the diametral direction, that is, in the direction parallel to the side faces of the permanent magnet insertion aperture. The six permanent magnets 208 are arranged along the circumference to alternately form the N pole and the S pole on their outer sides. The permanent magnet insertion apertures and the permanent magnets 208 have parallel side faces. This structure prevents the waste space when the permanent magnets 208 are magnetized in the diametral direction.

The permanent magnets 208 used here are rare-earth magnets having the excellent magnetic properties including the residual magnetic flux density and the magnetic coercive force. Oxide magnets, such as ferrite magnets, and metal magnets, such as alnico magnets, which are conventionally used, may be adopted instead of the rare-earth magnets. Typical examples of the rare-earth magnets applicable in this embodiment include neodymium magnets and samarium cobalt magnets.

The following describes the structure of the stator 100. In a similar manner to the rotor 200, the stator 100 is provided by laying a plurality of non-directional electromagnetic steel stator elements 102 one upon another. The non-directional electromagnetic steel stator elements 102 are punched out of a thin plate of non-directional electromagnetic steel and formed to the shape shown in FIG. 7. Each non-directional electromagnetic steel rotor element 102 has the eighteen teeth 104. The stator 100 has eight welding notches 108 for fixation welding and four key grooves, in which detent keys 110 are fitted, on the circumference thereof. The non-directional electromagnetic steel stator elements 102 are positioned and laid one upon another by means of a jig, and fixed to one another by welding the welding notches 108. This completes the stator 100.

In this state, coils 112 of U, V, and W phases for generating a revolving magnetic field are wound on the slots 106 formed between the respective adjoining teeth 104. The coils 112 are wound to enable each of the U, V, and W phases to generate six magnetic poles, that is, to enable the three phases to generate a total of eighteen magnetic poles. The six magnetic poles generated by each phase alternately have the N polarity and the S polarity along the circumference. For example, the U-phase coil is wound in a certain direction between a pair of slots which are two slots apart (slots 106a and 106d in FIG. 7) and wound in a reverse direction between a next pair of slots which are also two slots apart (slots 106d and 106f in FIG. 7). The U-phase coil is around the circumference of the stator 100 to the slot 106a while the winding direction is changed at every third slot. This arrangement causes the six magnetic poles having the alternate polarities along the circumference when electric current flows through the U-phase coil. The V-phase coil starts from the slot 106b and is wound in a similar manner to the U-phase coil. The W-phase coil starts from the slot 106c and is also wound in a similar manner to the U-phase coil. Other than this simple winding technique, a variety of known winding techniques may be adopted here; for example, one available winding technique generates a magnetic pole of one direction between the slots 106a and 106b and the slots 106d and 106e in FIG. 7.

The stator 100 with the coils 112 wound thereon is fixed to the case 20 by aligning the key grooves formed in the case 20 with the key grooves formed in the circumference of the stator 100 and inserting the detent keys 110 into the aligned key grooves. The rotor 200 is then attached rotatably to the case 20 via the bearings 22 and 23. This completes the magnets containing-type motor 10 of this embodiment.

The following describes the dimensions, for example, t1 and t2, of the magnetic pole elements 206 of the rotor 200 with the drawing of FIG. 1. These dimensions are set to minimize the cogging torque according to the designing method described below. FIGS. 1 and 7 are only for the purpose of describing the embodiment and do not precisely represent the dimensions.

Figure 2:
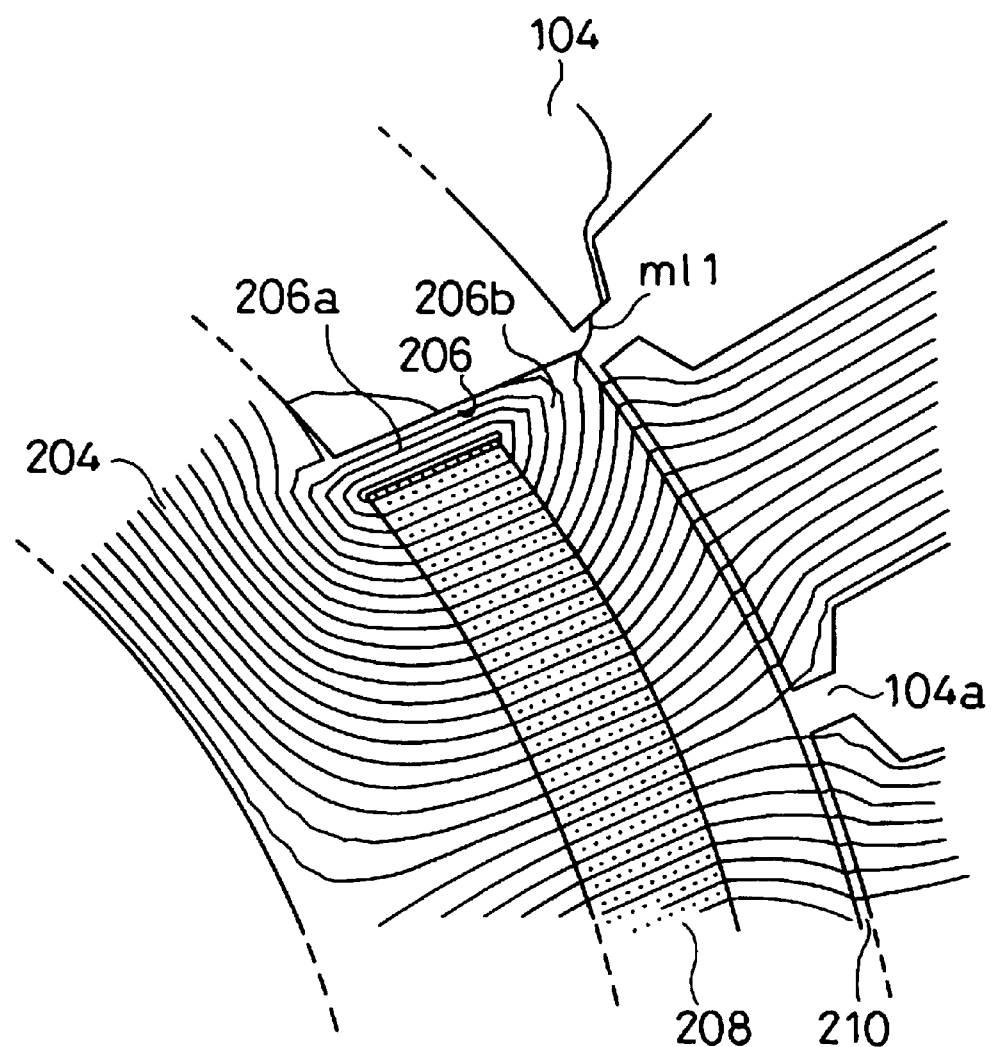
FIG. 2 shows the results of analyzing magnetic lines of force in the magnets containing-type motor under the condition of $t2 \geq t1$.
Figure 9:
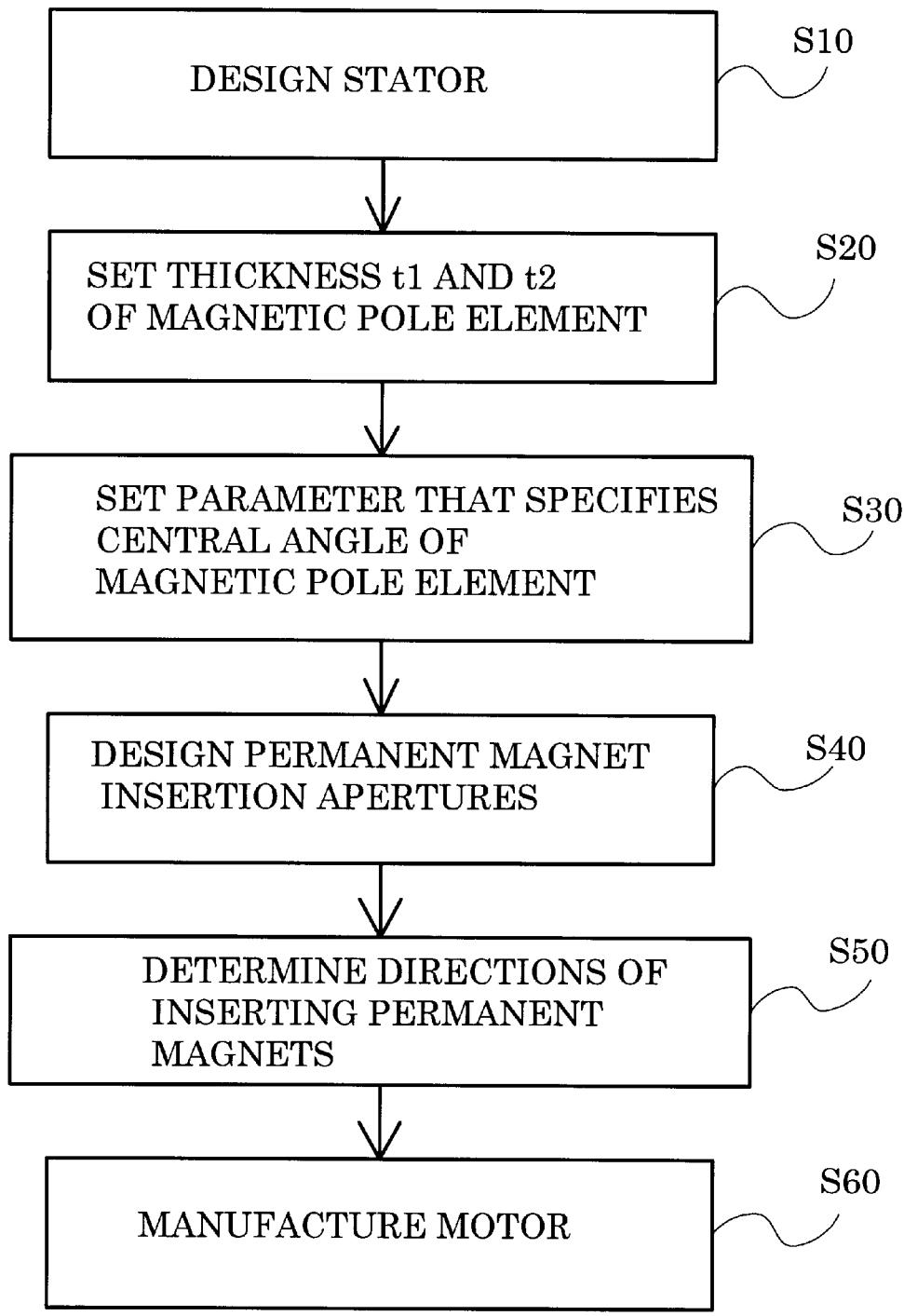
FIG. 9 is a flowchart showing a process of designing the magnets containing-type motor.

The flowchart of FIG. 9 shows the method of designing the magnets containing-type motor 10 of this embodiment. The method first designs the stator 100 of the magnets containing-type motor 10 of this embodiment at step S10. A concrete procedure specifies a variety of design factors regarding the stator 100, such as the number of teeth 104 formed on the stator 100 and its angular pitch Pp as well as a gap g from the rotor 200. The stator 100 of this embodiment has the eighteen teeth 104 as described previously. The teeth 104 are arranged at the equiangular pitch Pp along the circumference. The pitch Pp is equal to $\pi/9$ (rad), which corresponds to 20 degrees. The value obtained by dividing a length gp of a teeth gap element 104a (see FIG. 2) by a radius R of the inner circumference of the stator 100, that is, the central angle of the teeth gap element 104a, is equal to $\pi/90$ (rad), which corresponds to 2 degrees. The gap g between the stator 100 and the rotor 200 is 1% of the radius R of the inner circumference of the stator 100 (g/R=0.01).

The method then designs the rotor 200. In the process of designing the rotor 200, the method first sets the thicknesses t1 and t2 of each magnetic pole element 206 at step S20. It is convenient to set these thicknesses t1 and t2 with the unit of the preset gap g. The method is, however, not restricted to the technique of setting the thicknesses with the unit of the gap g. In the magnetic pole element 206 of the rotor 200, the thickness t1 of the magnetic pole side portion 206a is four times the gap g (t1=4 g), whereas the thickness t2 of the magnetic pole circumferential portion 206b is twice the gap g (t2=2 g). These dimensions are determined to satisfy the required output torque and the required strength of the magnetic pole element under the condition of high-speed rotations. These dimensions also satisfy either one of the conditions $(t2-t1)/g \leq 0$ and $(t2-t1)/g \geq 2$. In this embodiment, $(t2-t1)/g=-2$.

The method subsequently sets the parameter that specifies the central angle of the magnetic pole element 206, in order to minimize the cogging torque at step S30. Setting this parameter determines the length of the magnetic pole element 206 in the circumferential direction. The parameter is selected according to the value of $(t2-t1)/g$. In the case of $(t2-t1)/g \leq 0$, the selected parameter is an equivalent magnetic pole element opening angle L3. In the case of $(t2-t1)/g \geq 2$, the selected parameter is a magnetic pole element opening angle L2. In this embodiment, the selected parameter is the equivalent magnetic pole element opening angle L3.

The length of the magnetic pole element 206 that minimizes the cogging torque, that is, the equivalent magnetic pole element opening angle L3, is expressed by Equation (3) given above.

In this embodiment, the stator 100 has the eighteen teeth 104, and the rotor 200 has the six permanent magnets 208. The equivalent magnetic pole element opening angle L3 of the magnetic pole element 206 is accordingly set to be approximately twice the angular pitch Pp of the teeth 104. This means that the natural number n is set equal to 2 in Equation (3). The real numbers x, y, and z are respectively set as x=0.0, y=0.4, and z=-0.04, in order to prevent the equivalent magnetic pole element opening angle L3 having a fraction. The equivalent magnetic pole element opening angle L3 calculated according to Equation (3) is thus equal to $2\pi/9$ (rad), which corresponds to 40 degrees. This value is just twice the angular pitch Pp of the teeth 104 (L3/Pp= 2.0).

Referring back to the flowchart of FIG. 9, the method then designs the permanent magnet insertion aperture based on the above settings at step S40. In this embodiment, the permanent magnet insertion aperture of the magnetic pole element 206 is designed to have side faces formed by a pair of substantially parallel lines, which define an arc that is elongated by the length g from both ends of an arc having the central angle corresponding to the equivalent magnetic pole opening angle L3. The magnetic pole element 206 is designed to have side faces formed by a pair of substantially parallel lines, which are located outside both the side faces of the permanent magnet insertion aperture by the length t1.

Figure 5:
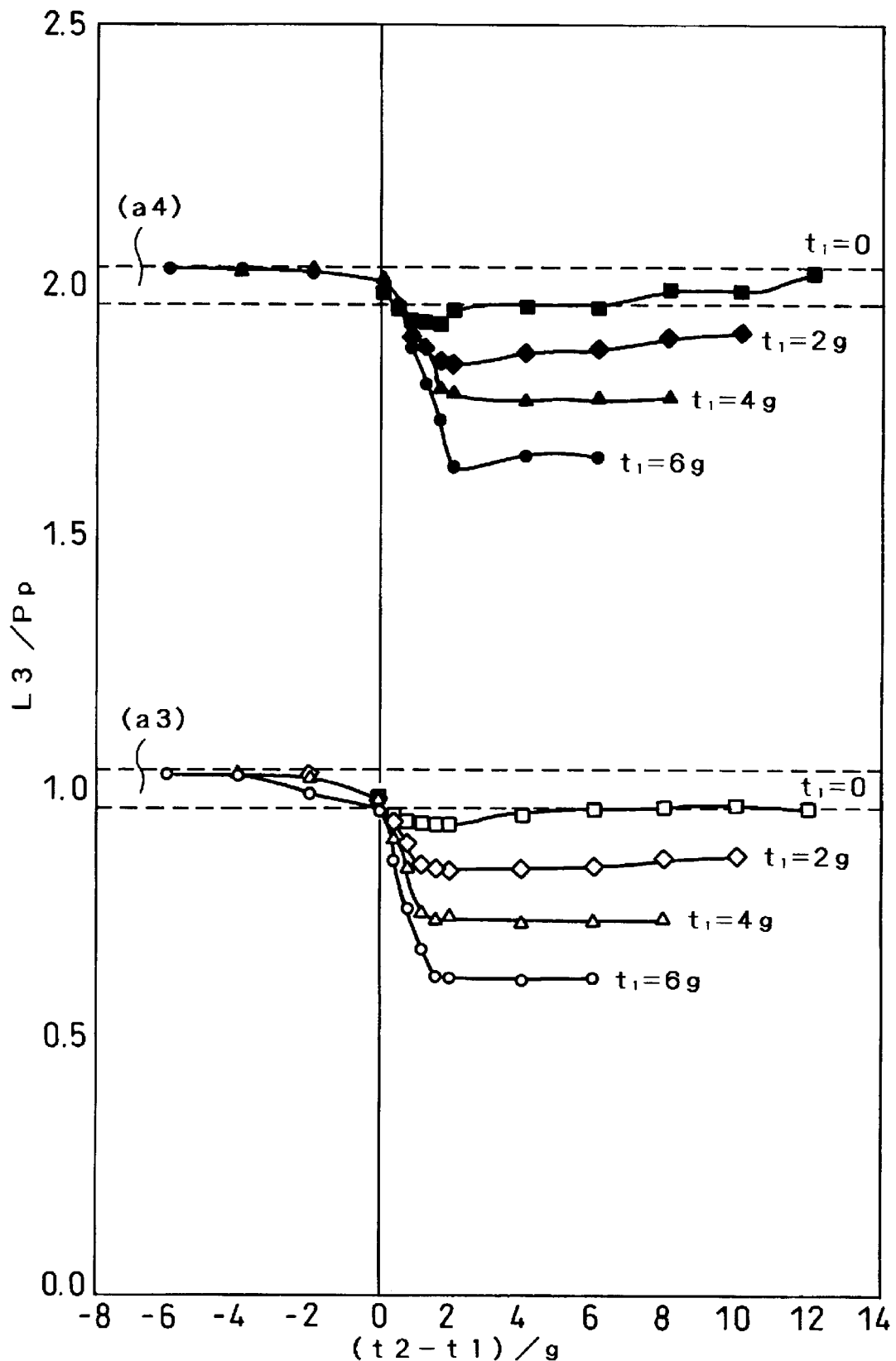
FIG. 5 is a graph showing the relationship between the equivalent magnetic pole element opening angle that gives the minimum cogging torque and the numerical elements of the magnetic pole element.
Figure 6:
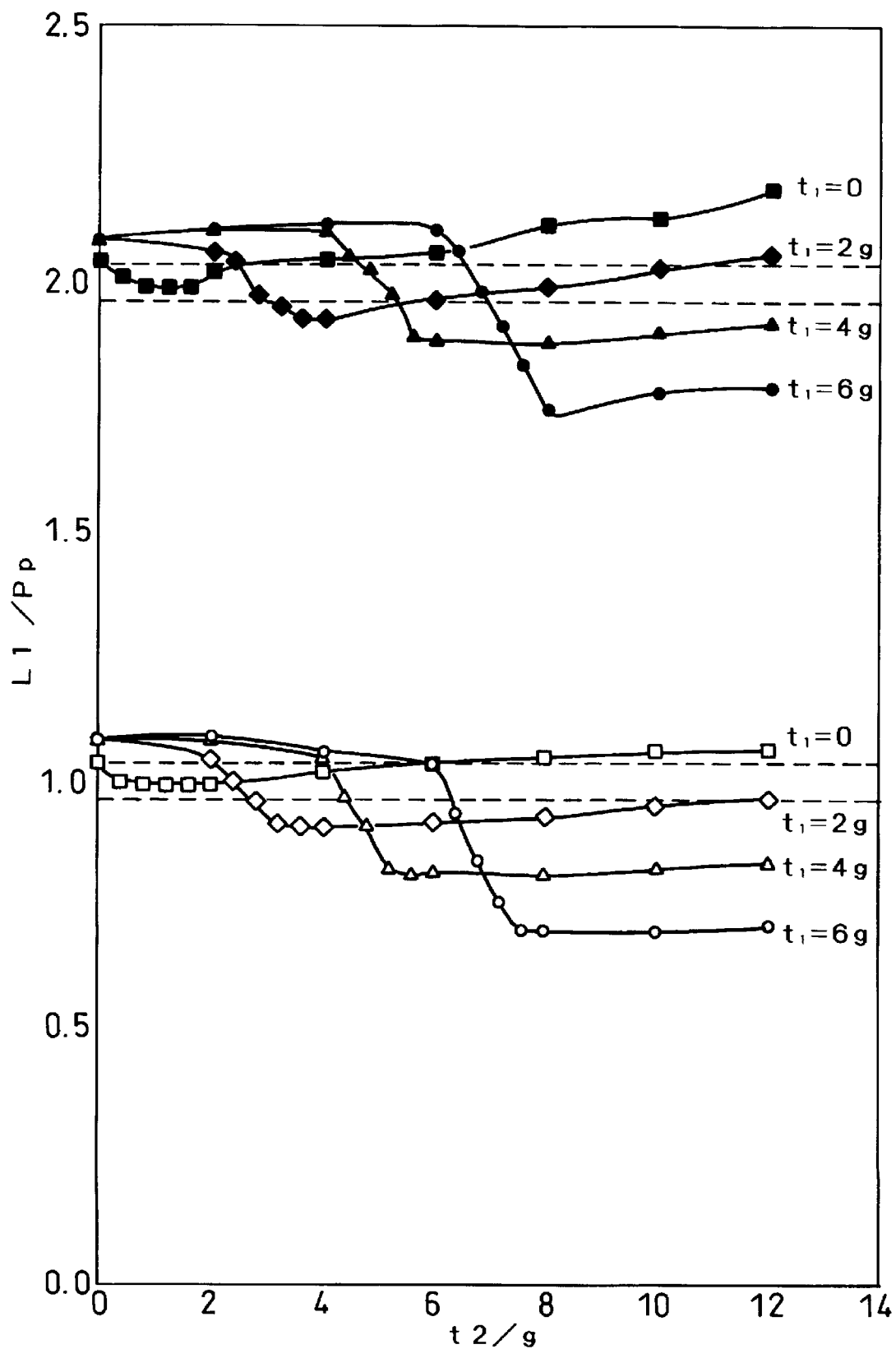
FIG. 6 is a graph showing the relationship between the magnet opening angle that gives the minimum cogging torque and the numeral elements of the magnetic pole element.
Figure 12A:
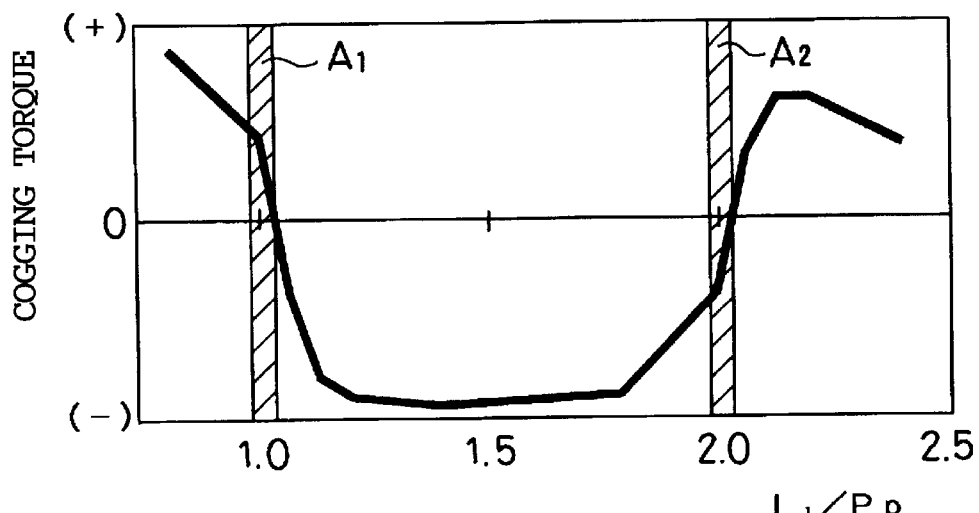
FIGS. 12A and 12B are graphs showing the relationship between the magnet opening angle and the cogging torque.
Figure 12B:
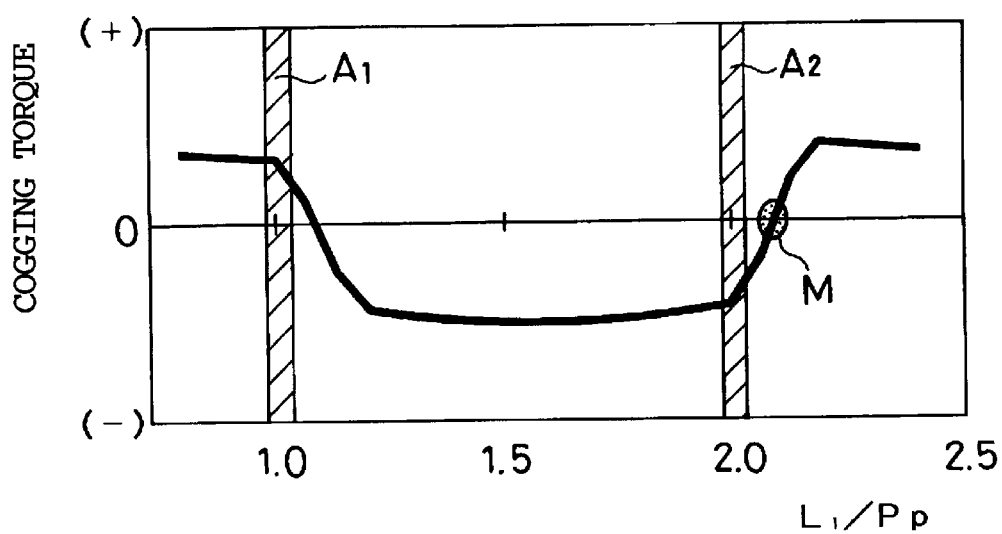

In this embodiment, the length of the magnetic pole element 206 is set in a range a4 shown in the graph of FIG. 5. An area M shown in the graph of FIG. 12B represents the result of computer-aided analysis with respect to the cogging torque in this embodiment. In the graphs of FIGS. 12A and 12B, the ratio L1/Pp of the magnet opening angle L1 to the angular pitch Pp of the teeth 104 is plotted as abscissa. In this embodiment, L1/Pp is approximately 2.1. The result of analysis shown in FIG. 12B shows that the cogging torque is extremely small in this embodiment.

Although the natural number n is set equal to 2 in this embodiment, the natural number n may be set equal to 1 according to the output torque required for the motor. In the latter case, the length of the magnetic pole element in the circumferential direction is set in another range a3 shown in the graph of FIG. 5 and is about half the length of the magnetic pole element 206 of this embodiment. The resulting motor accordingly has a smaller output torque than that of this embodiment. The natural number n may be set arbitrarily according to the output torque. Selection of an excessively large value, however, causes the adjoining magnetic pole elements 206 to overlap each other. There is accordingly an upper limit of the natural number n corresponding to the number of teeth 104 formed on the stator 100.

Figure 3:
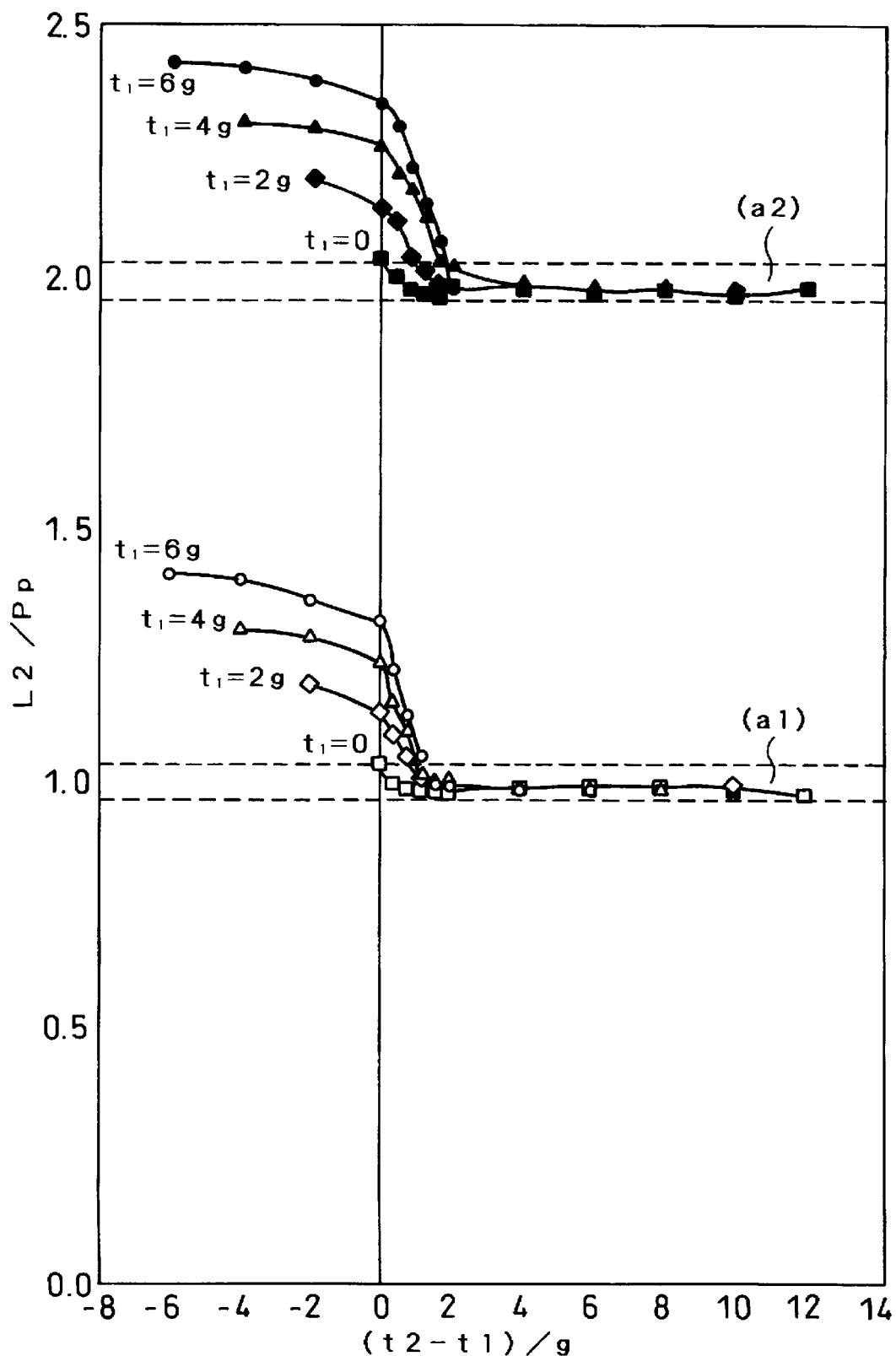
FIG. 3 is a graph showing the relationship between the magnetic pole element opening angle that gives the minimum cogging torque and the numerical elements of the magnetic pole element.
Figure 4:
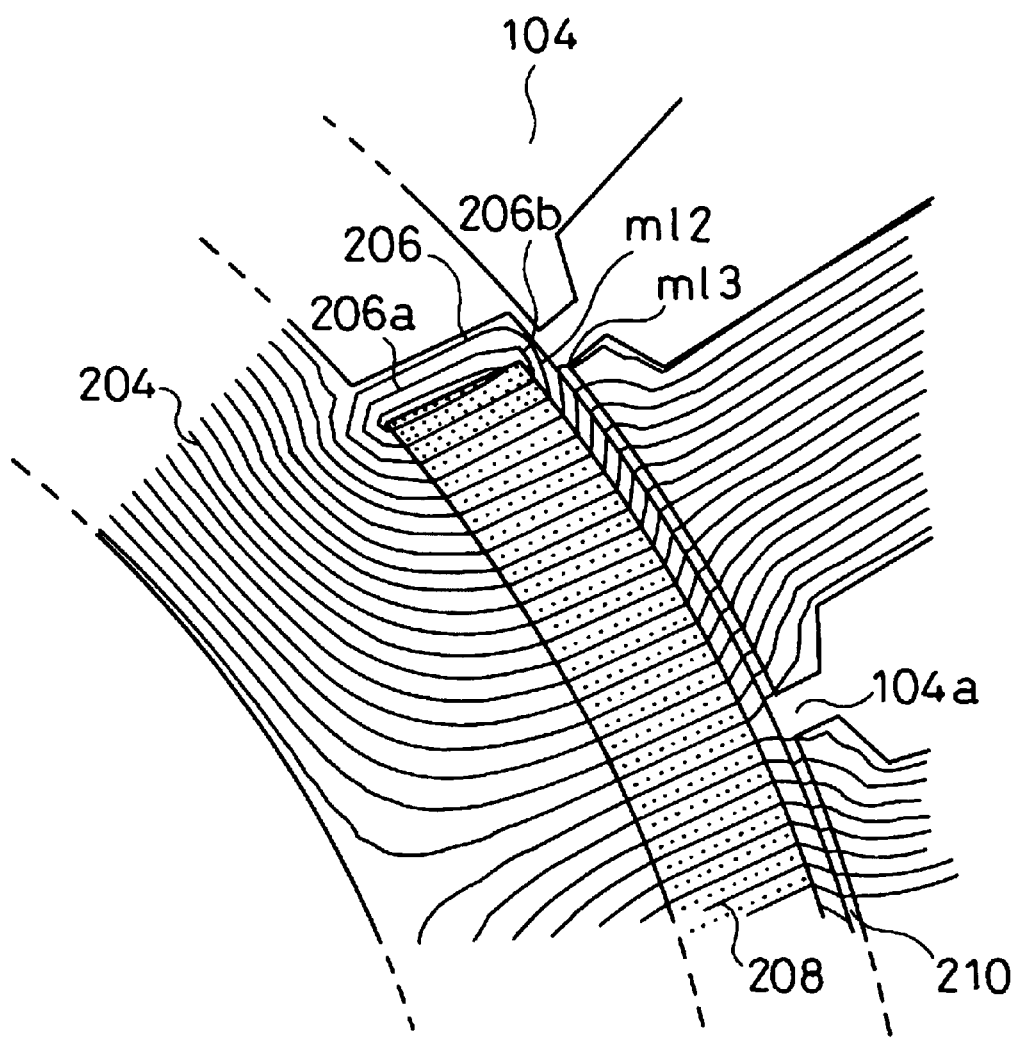
FIG. 4 shows the results of analyzing magnetic lines of force in the magnets containing-type motor under the condition of $t2 \leq t1$.

This embodiment regards the case where the relationship between the thickness t2 of the magnetic pole circumferential portion 206b, the thickness t1 of the magnetic pole side portion 206a, and the gap g between the stator 100 and the rotor 200 satisfies the condition of $(t2-t1)/g \leq 0$. The relationship may, however, satisfies the condition of $(t2-t1)/g \geq 2$. In the latter case, the length of the magnetic pole element 206 is set either in a range a1 or a range a2 shown in the graph of FIG. 3.

Referring back to the flowchart of FIG. 9, the method then determines the directions of inserting the respective permanent magnets 208 into the permanent magnet insertion apertures at step S50. As described previously, the directions of insertion are determined to enable the N pole and the S pole to appear alternately along the circumference of the rotor 200. The method manufactures the magnets containing-type motor 10 of the embodiment based on the above settings at step S60.

The magnets containing-type motor 10 of the embodiment works based on the known principle of rotations of the synchronous motor as discussed below. When the exciting current is flown through the coils 112 of the stator 100, for example, the U-phase coil, a magnetic field is generated to pass through the rotor 200 and the stator 100. The relationship between this magnetic field and the permanent magnets 208 determines the most stable relative position in the rotor 200. Regulating the exciting currents flowing through the U, V, and W phases generates a revolving magnetic field that rotates about the rotating shaft 212 of the motor 10. In the course of rotation of the magnetic field, the rotor 200 rotates while keeping the most stable position relative to the magnetic field. The rotating shaft 212 of the motor 10 accordingly generates the output torque. The revolving speed of the rotating shaft 212 is identical with the revolving speed of the revolving magnetic field. When a loading torque is applied to the rotating shaft 212 of the motor 10, the rotor 200 rotates while keeping an angular deviation (loading angle) corresponding to the loading torque from the most stable position.

Figure 10:
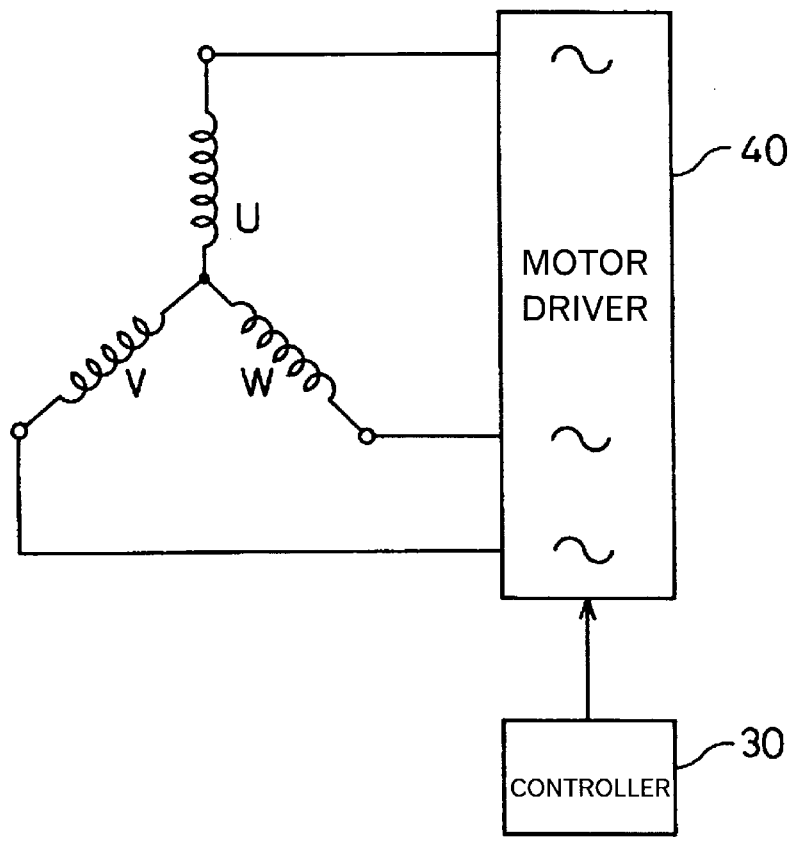
FIG. 10 shows a connecting state of the three-phase coils.
Figure 11:
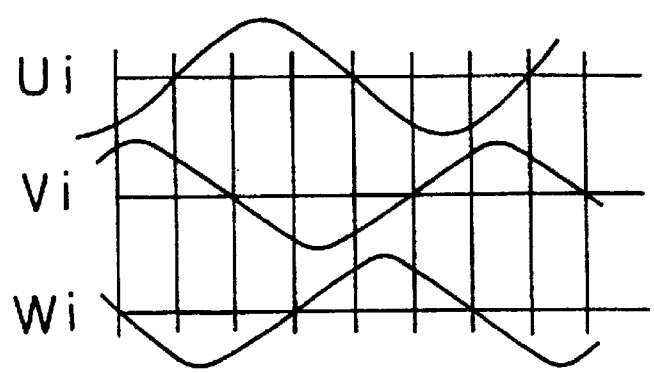
FIG. 11 is a graph showing the electric currents flowing through the three-phase coils.

Regulation of the exciting currents flowing through the three-phase coils 112 to generate a revolving magnetic field is described with the drawings of FIGS. 10 and 11. In the magnets containing-type motor 10 of the embodiment, the coils of the U phase, the V phase, and the W phase are mutually connected to form a Y connection and further connected to a motor driver 40, which is controlled by a controller 30, as shown in FIG. 10. The motor driver 40 causes alternating currents Ui, Vi, and Wi of a predetermined frequency having phase differences of 120 degrees to flow through the respective phases as shown in FIG. 11. This generates a revolving magnetic field corresponding to the predetermined frequency.

In this embodiment, the magnets containing-type motor 10 is controlled by the motor driver 40 and the controller 30, which are generally used for controlling synchronous motors. The motor driver 40 used here is an inverter having a total of six transistors or switching elements; two transistors for each of the U, V, and W phases. The controller 30 used here is a one-chip microprocessor including a control CPU, a ROM, and a RAM (not shown). The transistors constituting the motor driver 40 are arranged in pairs to form the source and the drain with respect to a pair of power source lines connecting with a positive terminal and a negative terminal of a power source (not shown). The respective phases U, V, and W of the three-phase coils are connected to the connection points. The control CPU successively controls the ON time of the transistors paired for each of the U, V, and W phases. This PWM control enables a plurality of pulse voltages of a varying width to be applied to the three-phase coils and causes electric currents of quasi-sine waves to flow through the respective coils. Regulation of the varying rate of the pulse width freely changes the frequency of the voltages applied to the three-phase coils and thereby ascertains rotation of the motor at a desired revolving speed. Any multi-phase coils may replace the three-phase coils used in this embodiment.

As described above, the magnets containing-type motor 10 of the embodiment, which can be driven by the conventional motor driver 40 and controller 30, effectively reduces the cogging torque as clearly shown in the result of the computer-aided analysis of FIG. 12B.

The above embodiment regards the motor 10 including the rotor 200 located on the center thereof. The principle of the present invention is, however, applicable to an outer rotor-type motor. In this case, a stator is disposed at the position where the rotor 200 is present in the above embodiment (see FIG. 7), whereas a rotor is disposed at the position where the stator 100 is present in the above embodiment. This arrangement causes the ring-shaped rotor to rotate about the stator.

The present invention is not restricted to the above embodiment or its modifications, but there may be many other modifications, changes, and alterations without departing from the scope or spirit of the main characteristics of the present invention.

It should be clearly understood that the above embodiment is only illustrative and not restrictive in any sense. The scope and spirit of the present invention are limited only by the terms of the appended claims.

What is claimed is:

1. A magnets containing-type alternating-current motor, comprising:
    a stator having a plurality of teeth that are arranged at a fixed central angular pitch Pp on a circumference of a circular cross section, each pair of adjoining teeth being separated from each other across a space having a length gp;
    a rotor that comprises a rotor core element and a plurality of magnetic pole elements protruded from said rotor core element in a diametral direction of said circular cross section and is rotatable about a central axis of said circular cross section; and
    a plurality of permanent magnets, each of which is fitted in a permanent magnet insertion aperture that is formed inside each of said plurality of magnetic pole elements along the central axis of said circular cross section,
        wherein each of said plurality of magnetic pole elements has an arc face defined by an arc of a radius that is different by a gap g from a radius R of an arc defining an outer face of said stator facing said rotor, and a pair of side faces defined by a pair of substantially parallel lines that extend from said rotor core element substantially in the diametral direction of said circular cross section,
        wherein said permanent magnet insertion aperture is defined by an arc of a radius that is different from a length t2 from said arc face and a pair of substantially parallel lines that are respectively located inside said pair of side faces by a length t1,
        wherein each of said plurality of permanent magnets has a sectional configuration substantially identical with that of said permanent magnet insertion aperture and is magnetized to make a magnetic flux flow substantially in the diametral direction of said circular cross section, and
        wherein an expression of $(t2-t1)/g \geq 2$ is satisfied and a central angle L2 of said arc defining said arc face of said magnetic pole element is given by:

$$L2 = (n+z) \cdot Pp + x \cdot (g/R) + y \cdot (gp/R)$$

where n denotes an arbitrary natural number, x denotes a real number satisfying $-0.6 \leq x \leq 0.6$, y denotes a real number satisfying $0.3 \leq y \leq 0.5$, and z denotes a real number satisfying $-0.06 \leq z \leq -0.04$.

2. A magnets containing-type alternating-current motor, comprising:
    a stator having a plurality of teeth that are arranged at a fixed central angular pitch Pp on a circumference of a circular cross section, each pair of adjoining teeth being separated from each other across a space having a length gp;
    a rotor that comprises a rotor core element and a plurality of magnetic pole elements protruded from said rotor core element in a diametral direction of said circular cross section and is rotatable about a central axis of said circular cross section; and
    a plurality of permanent magnets, each of which is fitted in a permanent magnet insertion aperture that is formed inside each of said plurality of magnetic pole elements along the central axis of said circular cross section,
        wherein each of said plurality of magnetic pole elements has an arc face defined by an arc of a radius that is different by a gap g from a radius R of an arc defining an outer face of said stator facing said rotor, and a pair of side faces defined by a pair of substantially parallel lines that extend from said rotor core element substantially in the diametral direction of said circular cross section,
        wherein said permanent magnet insertion aperture is defined by an arc of a radius that is different from a length t2 from said arc face and a pair of substantially parallel lines that are respectively located inside said pair of side faces by a length t1,
        wherein each of said plurality of permanent magnets has a sectional configuration substantially identical with that of said permanent magnet insertion aperture and is magnetized to make a magnetic flux flow substantially in the diametral direction of said circular cross section, and wherein an expression of $(t2-t1)/g \leq 0$ is satisfied and a central angle L3 of an arc, which is obtained by cutting a length 2 g from an arc defined by intersections of a pair of substantially parallel lines, which define a pair of side faces of said permanent magnet fitted in said permanent magnet insertion aperture, and said central angle, is given by:

$$L3 = (n+z) \cdot Pp + x \cdot (g/R) + y \cdot (gp/R)$$

where n denotes an arbitrary natural number, x denotes a real number satisfying $-0.6 \leq x \leq 0.6$, y denotes a real number satisfying $0.3 \leq y \leq 0.5$, and z denotes a real number satisfying $-0.06 \leq z \leq -0.04$.

3. A method of designing a magnets containing-type alternating-current motor, said magnets containing-type alternating-current motor comprising: a stator having a plurality of teeth that are arranged at a fixed central angular pitch Pp on a circumference of a circular cross section, each pair of adjoining teeth being separated from each other across a space having a length gp; a rotor that comprises a rotor core element and a plurality of magnetic pole elements protruded from said rotor core element in a diametral direction of said circular cross section and is rotatable about a central axis of said circular cross section; and a plurality of permanent magnets, each of which is fitted in a permanent magnet insertion aperture that is formed inside each of said plurality of magnetic pole elements along the central axis of said circular cross section, said method comprising the steps of:

(a) designing each of said plurality of magnetic pole elements to have a sectional configuration comprising an arc face defined by an arc of a radius that is different by a gap g from a radius R of an arc defining an outer face of said stator facing said rotor, and a pair of side faces defined by a pair of substantially parallel lines that extend from said rotor core element substantially in the diametral direction of said circular cross section;

(b) designing said permanent magnet insertion aperture to have a sectional configuration comprising an arc of a radius that is different from a length t2 from said arc face and a pair of substantially parallel lines that are respectively located inside said pair of side faces by a length t1;

(c) designing each of said plurality of permanent magnets to have a sectional configuration substantially identical with that of said permanent magnet insertion aperture and to be inserted into said permanent magnet insertion aperture in order to make a magnetic flux flow substantially in the diametral direction of said circular cross section; and (d) setting a parameter that specifies a central angle of said arc face of said magnetic pole element equal to a value that minimizes a cogging torque, based on a function of R, Pp, g, and gp provided according to a predetermined relation of t1, t2, and g.

4. A method in accordance with claim 3, wherein said predetermined relation of t1, t2, and g represents which is greater between a parameter $(t2-t1)/g$ and a predetermined threshold value.

5. A method in accordance with claim 3, wherein said function is a linear polynomial of Pp, g/R, and gp/R based on said predetermined relation of t1, t2, and g.

6. A method in accordance with claim 3, wherein said parameter that specifies the central angle of said arc face of said magnetic pole element is a central angle L2 of said arc face of said magnetic pole element.

7. A method in accordance with claim 3, wherein said parameter that specifies the central angle of said arc face of said magnetic pole element is a central angle L3 of an arc, which is obtained by cutting a length 2 g from an arc defined by intersections of a pair of substantially parallel lines, which define a pair of side faces of said permanent magnet fitted in said permanent magnet insertion aperture, and said arc face of said magnetic pole element.

8. A method in accordance with claim 3, wherein said parameter is a central angle L2 of said arc face of said magnetic pole element, wherein said predetermined relation satisfies an expression of $(t2-t1)/g \geq 2$, and wherein said function that defines said parameter L2 under said predetermined relation is expressed as:

$$L2 = (n+z) \cdot Pp + x \cdot (g/R) + y \cdot (gp/R)$$

where n denotes an arbitrary natural number, x denotes a real number satisfying $-0.6 \leq x \leq 0.6$, y denotes a real number satisfying $0.3 \leq y \leq 0.5$, and z denotes a real number satisfying $-0.06 \leq z \leq -0.04$.

9. A method in accordance with claim 3, wherein said parameter is a central angle L3 of an arc, which is obtained by cutting a length 2 g from an arc defined by intersections of a pair of substantially parallel lines, which define a pair of side faces of said permanent magnet fitted in said permanent magnet insertion aperture, and said arc face of said magnetic pole element, wherein said predetermined relation satisfies an expression of $(t2-t1)/g \leq 0$, and wherein said function that defines said parameter L3 under said predetermined relation is expressed as:

$$L3 = (n+z) \cdot Pp + x \cdot (g/R) + y \cdot (gp/R)$$

where n denotes an arbitrary natural number, x denotes a real number satisfying $-0.6 \leq x \leq 0.6$, y denotes a real number satisfying $0.3 \leq y \leq 0.5$, and z denotes a real number satisfying $-0.06 \leq z \leq -0.04$.

* * * * *